(12) United States Patent
Obasanjo et al.

(10) Patent No.: US 9,405,845 B2
(45) Date of Patent: Aug. 2, 2016

(54) ADAPTABLE LAYOUTS FOR SOCIAL FEEDS

(75) Inventors: Oludare V. Obasanjo, Renton, WA (US); Seung-Hae Park, Seattle, WA (US); Benjamin C. Walters, Seattle, WA (US); Jared A. Russell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 12/814,709

(22) Filed: Jun. 14, 2010

(65) Prior Publication Data
US 2011/0283185 A1    Nov. 17, 2011

Related U.S. Application Data

(60) Provisional application No. 61/345,550, filed on May 17, 2010.

(51) Int. Cl.
*G06F 17/00* (2006.01)
*G06F 17/30* (2006.01)
*G06F 17/24* (2006.01)
*G06Q 30/02* (2012.01)

(52) U.S. Cl.
CPC .......... *G06F 17/3089* (2013.01); *G06F 17/248* (2013.01); *G06F 17/30017* (2013.01); *G06Q 30/02* (2013.01); *G06F 17/30861* (2013.01); *G06F 17/30867* (2013.01)

(58) Field of Classification Search
CPC ............ G06F 17/248; G06F 17/30017; G06F 17/30861; G06F 17/30867; G06F 17/3089; G06Q 30/02
USPC .......................................... 715/243, 249, 250
See application file for complete search history.

(56) References Cited

U.S. PATENT DOCUMENTS

| | | |
|---|---|---|
| 2002/0143822 A1 | 10/2002 | Brid et al. |
| 2003/0110297 A1 * | 6/2003 | Tabatabai et al. |
| 2005/0193054 A1 * | 9/2005 | Wilson et al. ................. 709/200 |
| 2008/0177708 A1 | 7/2008 | Ayyar et al. |
| 2008/0189395 A1 * | 8/2008 | Stremel et al. ................ 709/219 |
| 2008/0209329 A1 * | 8/2008 | DeFranco et al. ............ 715/733 |

(Continued)

FOREIGN PATENT DOCUMENTS

| | | |
|---|---|---|
| JP | 2007328658 A | 12/2007 |
| JP | 2008287615 A | 11/2008 |

OTHER PUBLICATIONS

Hume et al., Designing Mobile Applications for Multiple Form Factors, Jul. 15, 2008, Trutap V1, pp. 10.*

(Continued)

*Primary Examiner* — Chau Nguyen
(74) *Attorney, Agent, or Firm* — Jim Banowsky; Doug Barker; Micky Minhas

(57) ABSTRACT

Adaptable layouts for social feeds are described. In embodiments, shared content is received as a social network action initiated at a user device by a social network user. An activity is generated based on the social network action to collect metadata associated with the shared content. The shared content and the metadata is then mapped to layout templates that are each generated for different display layout formats associated with different types of client devices. Additionally, the shared content and the metadata is mapped to additional layout templates that are each generated for different social network form factors.

17 Claims, 7 Drawing Sheets

(56) References Cited

U.S. PATENT DOCUMENTS

| | | | |
|---|---|---|---|
| 2009/0144392 A1 | 6/2009 | Wang et al. | |
| 2009/0234815 A1* | 9/2009 | Boerries | G06F 17/30867 |
| 2009/0319577 A1 | 12/2009 | Obasanjo et al. | |
| 2010/0043017 A1* | 2/2010 | Paul et al. | 719/328 |
| 2010/0070899 A1* | 3/2010 | Hunt | G06F 17/30861 715/769 |
| 2010/0105440 A1 | 4/2010 | Kruzeniski | |
| 2010/0248701 A1* | 9/2010 | Vance et al. | 715/739 |
| 2010/0262918 A1* | 10/2010 | Angell et al. | 715/738 |
| 2010/0293105 A1 | 11/2010 | Blinn et al. | |
| 2011/0038470 A1* | 2/2011 | Kent | H04M 1/575 379/142.04 |
| 2011/0054960 A1* | 3/2011 | Bhatia et al. | 705/7 |
| 2011/0055265 A1* | 3/2011 | Firminger et al. | 707/779 |
| 2012/0066286 A1* | 3/2012 | Heredia | G06F 17/30899 709/201 |

OTHER PUBLICATIONS

Christine Perey, Social Networking Segmentation: Celebrating Community Diversity in a Framework—A W3C Workshop on the Future of Social Networking Position Paper, Nov. 20, 2008, pp. 5.*

"International Search Report", Mailed Date: Jan. 19, 2012, Application No. PCT/US2011/036547, Filed Date: May 13, 2011, pp. 8.

"Windows Live Essentials Wave 4—Messenger", Retrieved from: <http://www.frederickding.com/posts/2010/06/windows-live-messenger-wave-4-26816/> on Jan. 10, 2011, (Jun. 26, 2010),11 pages.

Arah, Tom "Can Your Browser Do This? Adaptive Layout", Retrieved from: <http://www.pcpro.co.uk/blogs/2009/09/14/can-your-browser-do-this-adaptive-layout/> on Jan. 10, 2011 (Sep. 14, 2009),7 pages.

Owoh, Brujo "A Quick Look at Mobile Web Designs", Retrieved from: <http://sixrevisions.com/user-interface/a-quick-look-at-mobile-web-designs/> on Jan. 10, 2010), 16 pages.

Taylor, Carol A., "Adaptive Personalization—Full Report", Retrieved from: <http://courses.washington.edu/mobileux/adaptive-full.html> on Jan. 10, 2011,5 pages.

"Foreign Office Action", Chinese Application No. 201180024386.4, (Jun. 27, 2013), 13 Pages.

"Foreign Office Action", CN Application No. 201180024386.4, Feb. 8, 2014, 12 Pages.

"Foreign Office Action", CN Application No. 201180024386.4, Aug. 5, 2014, 11 Pages.

"Foreign Office Action", CN Application No. 201180024386.4, Feb. 28, 2015, 7 Pages.

"Extended European Search Report", EP Application No. 11784006.6, Jun. 1, 2015, 7 Pages.

"Foreign Notice of Allowance", CN Application No. 201180024386.4, Jul. 6, 2015, 4 Pages.

* cited by examiner

| Layout Template 200 | |
|---|---|
| Description | Shared photos on Social Networking Site (Web activity) |
| Single Activity Title | {publisher-id:publisher} shared photos - via {hlink:AppName="Social Networking Site"} |
| Single Activity Body | {list:Thumbs({image:Photo})} |
| ---- Layout Properties ---- | |
| WEB | LP (SingleActivityTitle): {publisher-id:publisher} shared photos<br>LP (Via): {hlink:AppName="Social Networking Site App"}<br>LP (PrimaryLinkUrl): {list:Thumbs({image:Photo})} |
| DESKTOP CLIENT | LP (Type): Photo<br>LP (PrimaryImage): {list:Thumbs({image:Photo})}<br>LP (Publisher): {publisher-id:publisher}<br>LP (Action): shared photos<br>LP (Footer): via {hlink:AppName="Social Networking Site App"} |
| COMMENT NOTIFICATION E-MAIL | LP (Subject):{text:Publisher_firstName} {text:Publisher_lastName} commented on your {APPNAME} activity<br>LP (FullName): {text:Publisher_firstName} {text:Publisher_lastName} LP (PublisherUserTile):(Value):{image:Publisher_userTile}<br>LP (CommenterProfileUrl):(Value):{hlink:CommenterProfileUrl}<br>LP (CommentPageUrl):(Value):{hlink:CommentPageUrl}<br>LP (Comment):{text:Comment} LP (Sentence): commented on your {APPNAME} activity |
| COMMENT NOTIFICATION DESKTOP CLIENT | LP (FullName): {text:Publisher_firstName} {text:Publisher_lastName} LP (Sentence): commented on your {APPNAME} activity<br>LP (CommentPageUrl):(Value):{hlink:CommentPageUrl}<br>LP (Comment):{text:Comment}<br>LP (PublisherCid):{text:Publisher_cid} |
| COMMENT NOTIFICATION SMS | LP (BodyBeforeComment):{text:Publisher_firstName} {text:Publisher_lastName} commented on your {APPNAME} activity: " LP (Comment):{text:Comment}<br>LP (BodyAfterComment):" {hlink:CommentPageUrl.Value} Reply to add comment.<br>LP (InboundSmsContext): {text:IsGroupComment},{text:TargetOwnerCid},{text:ResourceId},{text:ActivityId} |
| COMMENT NOTIFICATION MOBILE | LP (Subject):{text:Publisher_firstName} {text:Publisher_lastName} commented on your {APPNAME} activity<br>LP (Body):{text:Publisher_firstName} {text:Publisher_lastName} commented on your {APPNAME} activity: {text:Comment} {hlink:CommentPageUrl.Value} |

Fig. 2

ADAPTABLE LAYOUTS FOR SOCIAL FEEDS

RELATED APPLICATION

This application claims priority to U.S. Provisional Application Ser. No. 61/345,550 filed May 17, 2010, entitled "Adaptable Layouts for Social Feeds" to Obasanjo et al., the disclosure of which is incorporated by reference herein in its entirety.

BACKGROUND

Many social networking sites, such as FACEBOOK and TWITTER enable users to receive updates on many different types of devices, including via native applications running on mobile phones and Web site applications displayed at a desktop computer or on a television device that is connected to a gaming system. The users can receive social network updates as social activity feeds from multiple devices with varied form factors. Developers that write applications to publish updates to the many different social networking sites do not typically include enough metadata to ensure that published content and updates will display optimally on the many different types of devices. For example, an application that publishes a shared link may include a thumbnail of the Web site which may display well at a desktop computer, but may not display well when viewed on a big-screen television. Further, a user can upload and share a video, but may not be able to indicate or provide alternate video streams for devices that are unable to playback the original format of the video. For example, Flash videos shared on a social networking site may not be viewable in a device application for the social network, such as on a mobile phone that does not support the Flash format.

SUMMARY

This summary is provided to introduce simplified concepts of adaptable layouts for social feeds that are further described below in the Detailed Description. This summary is not intended to identify essential features of the claimed subject matter, nor is it intended for use in determining the scope of the claimed subject matter.

Adaptable layouts for social feeds are described. In embodiments, shared content is received as a social network action initiated at a user device by a social network user. The shared content can include a status update from the social network user, uploaded photos, a shared URL link, or other shared content. An activity is generated based on the social network action to collect metadata associated with the shared content. The shared content and the metadata is then mapped to layout templates that are each generated for different display layout formats associated with different types of client devices. Additionally, the shared content and the metadata is mapped to additional layout templates that are each generated for different social network form factors.

In other embodiments, a request for the shared content is received to display the shared content at a client device in a social network application, where the request includes a designated social network form factor. A layout template is determined that corresponds to the shared content and the designated social network form factor. The shared content is then communicated to the client device in the layout template for display in the designated social network form factor. In another embodiment, a request for the shared content is received to display the shared content at a client device, where the request includes a designated display layout format for the client device. A layout template is determined that corresponds to the shared content and the designated display layout format for the client device. The shared content is then communicated to the client device in the layout template for display in the designated display layout format.

BRIEF DESCRIPTION OF THE DRAWINGS

Embodiments of adaptable layouts for social feeds are described with reference to the following drawings. The same numbers are used throughout the drawings to reference like features and components:

FIG. 2 illustrates an example template in accordance with one or more embodiments.

DETAILED DESCRIPTION

Adaptable layouts for social feeds are described. In embodiments, a social network service can receive shared content from a social network user, such as a status update, uploaded photos, a shared URL link, or other shared content. The shared content, and metadata associated with the shared content, can then be mapped to layout templates. The layout templates can each be generated for different display layout formats associated with different types of client devices. Additionally, the layout templates can each be generated for different social network form factors, such as when a social networking site is displayed at a client device. When a social network user requests to view the shared content, such as via a client device of the user, a presentation layout template is determined that corresponds to the shared content and a social network form factor and/or a display layout format for the client device. The shared content can then be communicated or delivered to the requesting client device in the presentation layout template that provides an optimal display of the shared content for the social network user at the client device.

In embodiments of adaptable layouts for social feeds, social network updates are defined using a template format. The template format provides a mechanism to define how an update is presented on different form factors and devices, as well as a generic fallback rendering option. Applications that display the social network updates can utilize and extract information specific to rendering an update in a way that matches the capabilities of the form factor or particular device when rendering the update. Presentation layout templates can be selected to optimally display a social network update in various form factors and/or for various client devices.

While features and concepts of the described systems and methods for adaptable layouts for social feeds can be implemented in any number of different environments, systems, and/or various configurations, embodiments of adaptable layouts for social feeds are described in the context of the following example systems and environments.

Figure 1:
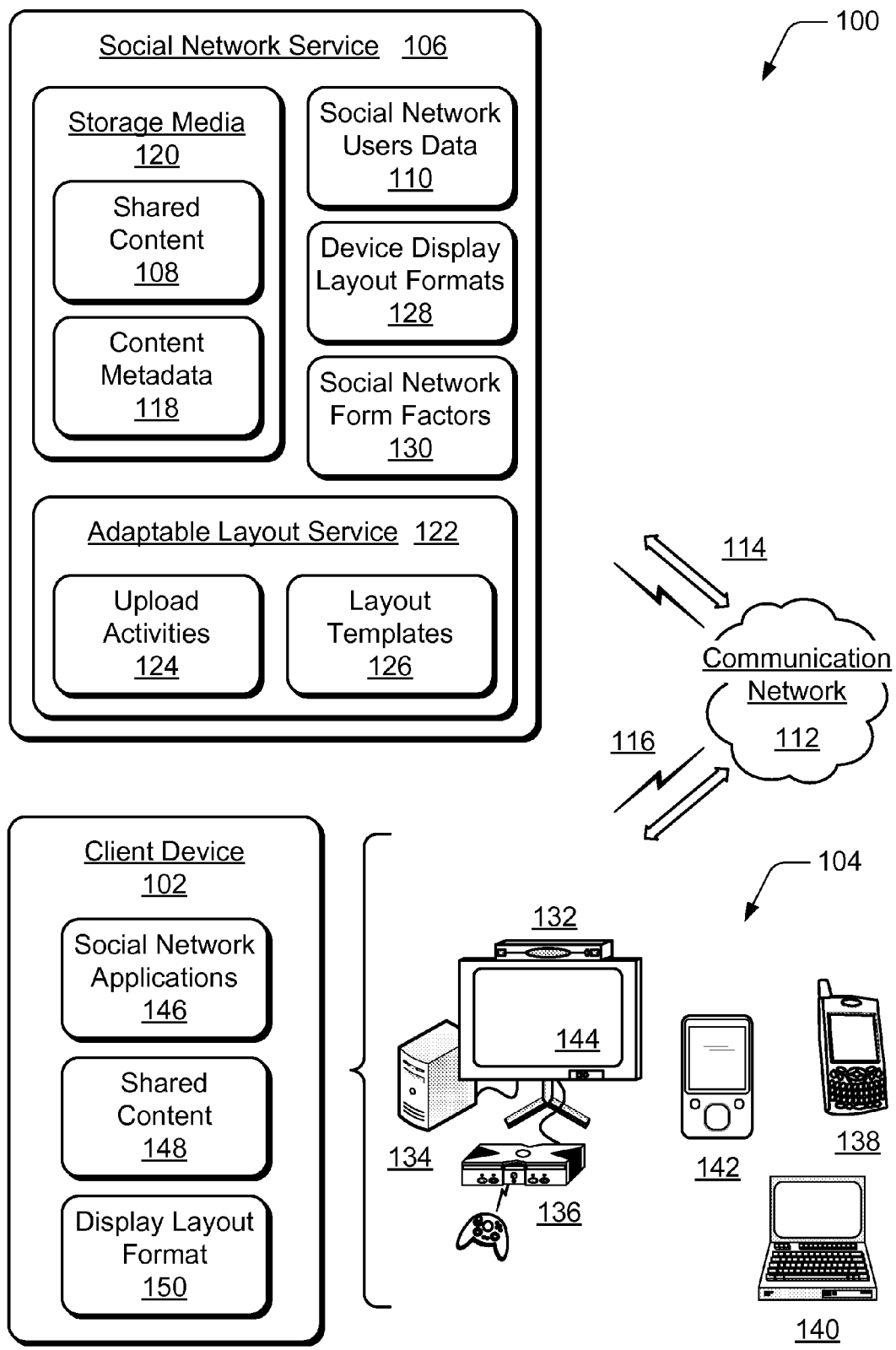
FIG. 1 illustrates an example system in which embodiments of adaptable layouts for social feeds can be implemented.

FIG. 1 illustrates an example system 100 in which various embodiments of adaptable layouts for social feeds can be implemented. The example system 100 includes a client device 102, which may be configured as any type of client device 104. Some of the various client devices 104 include wired and/or wireless devices, and may also be referred to as user devices and/or portable devices. The example system 100 also includes a social network service 106 that receives shared content 108 as a social network action initiated at a user device by a social network user. For example, a social network user may share content such as a status update from the social network user, uploaded photos, a shared URL link, or any other type of shared content. The shared content 108 can include any type of audio, video, and/or image data received from any client or media content source. The social network service 106 supports social networking by maintaining social network users data 110 that corresponds to social network users of the various client devices, and can communicate the shared content 108 to a client device 104 via a communication network 112.

The communication network 112 can be implemented to include a broadcast network, an IP-based network 114, and/or a wireless network 116 that facilitates shared content distribution and communication between the social network service 106 and any number of the various client devices. The communication network 112 can also be implemented using any type of network topology and/or communication protocol, and can be represented or otherwise implemented as a combination of two or more networks. The communication network 112 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The social network service 106 may be implemented as any type of social network site that supports social networking for the social network users based on any type of social groups, such as co-workers, friends, family, a group based on common interests, a group of unknown contacts that are linked based on some commonality, and so on. A social network user can utilize the social network service 106 as a basis to permit sharing of media content, photos, blogs, status updates, and the like. The social network service 106 may use a permissioning technique, such as a selected or allowed relationship, to permit or restrict access to content associated with a user account of the social network service. For example, a user of the client device 102 may have an associated user account with the social network service 106, and via the client device 102, the user can select contacts and allow social networking with other users, as well as upload shared content.

The social network service 106 can include server devices to communicate, or otherwise distribute, shared content and/or associated content metadata 118 to any number of the various client devices. In this example system 100, the social network service 106 includes storage media 120 to store or otherwise maintain various content and data, such as the shared content 108 and the content metadata 118. The content metadata 118 can include any type of identifying criteria, descriptive information, and/or attributes associated with the shared content 108. The storage media 120 can be implemented as any type of memory and/or suitable electronic data storage. Additionally, the social network service 106 may be implemented as a subscription-based service from which any of the various client devices 104 can request the shared content 108 to download and/or display for viewing, or otherwise render for playback. The social network service 106 manages the shared content distribution to the various client devices 104, such as when a request for shared content is received from a client device 104, and the social network service 106 communicates or provides data segments of the shared content to the client device.

In this example system 100, the social network service 106 includes an adaptable layout service 122 that can be implemented as computer-executable instructions and executed by one or more processors to implement the various embodiments described herein for adaptable layouts for social feeds. The social network service 106 can also be implemented with any number and combination of differing components as further described with reference to the example device shown in FIG. 8. Additionally, the adaptable layout service 122 may be implemented as an independent service separate from the social network service (e.g., on a separate server or by a third party service).

In various embodiments, the adaptable layout service 122 is implemented to generate an activity to collect metadata associated with shared content based on a social network action, such as when a social network user uploads shared content. Social network updates include properties that describe how an update (e.g., shared content 108) can be rendered in various form factors. This information (e.g., content metadata 118) is associated with each type of update. For example, an update to share a set of photos when uploaded may include information describing that the photos can be displayed for viewing as a filmstrip of small thumbnail images on a social feed for a social networking Web page. The information may also describe that the photos be displayed for viewing as a slideshow with full resolution images on a desktop version of the same social feed.

When an application is publishing an update on behalf of a user to the social network service 106, the adaptable layout service 122 can correlate the information needed to render the update in different form factors, as well as behaviors if included with the update. In the example of the uploaded photos, the information may include the thumbnail images for rendering on the Web page, as well as the full resolution images for rendering at the desktop computer. The notion of an upload activity 124 summarizes an action, such as when shared photos are uploaded, and for any given upload activity 124, there are corresponding layout properties.

The adaptable layout service 122 is implemented to map the shared content 108 and the content metadata 118 to layout templates 126 that can each be generated for different display layout formats 128 and/or for different social network form factors 130. Each of the layout templates 126 include layout properties that correlate to template data for an upload activity 124 that is generated based on a social network action. The different display layout formats 128 are associated with different types of client devices 104, and the different social network form factors 130 are associated with different types of social network Web sites. An example layout template is shown in FIG. 2. For an action to share a URL link (e.g., shared content), an upload activity may be generated to obtain the URL from the link, get a thumbnail image for the link, generate a large image for display on larger displays, and include the name of the social network user that is sharing the link in the template data.

The social network service 106 can receive a request for the shared content 108 to display at a client device 104 in a social network application, and the request from the client device includes a designated social network form factor. The adaptable layout service 122 is implemented to determine a layout template 126 that corresponds to the shared content and the designated social network form factor 130. The shared content is then communicated to the requesting client device in the layout template for display in the designated social network form factor. Alternatively or in addition, the social network service 106 can receive a request for the shared content 108 to display at a client device 104, and the request from the client device includes a designated display layout format for the client device. The adaptable layout service 122 is further implemented to determine a layout template 126 that corresponds to the shared content and the designated display layout format 128 for the client device. The shared content is then communicated to the requesting client device in the layout template for display in the designated display layout format.

In this example system 100, a client device 104 can be implemented as any one or combination of a television client device 132 (e.g., a television set-top box, a digital video recorder (DVR), etc.), a computer device 134, a gaming system 136, an appliance device, an electronic device, and/or as any other type of client device or user device that may be implemented to receive media content in any form of audio, video, and/or image data. The various client devices 104 can also include wireless devices implemented to receive and/or communicate wireless data, such as any one or combination of a mobile phone 138 (e.g., cellular, VoIP, WiFi, etc.), a portable computer device 140, a media device 142 (e.g., a personal media player, portable media player, etc.), and/or any other wireless device that can receive media content in any form of audio, video, and/or image data. A client system can include a respective client device and display device 144 that together render or playback any form of audio, video, and/or image media content and media assets. The display device 144 can be implemented as any type of a television, high definition television (HDTV), LCD, or similar display system.

Any of the various client devices 104 can be configured as the client device 102 and implemented with one or more processors, communication components, memory components, signal processing and control circuits, and a media content rendering system. Further, any of the client devices 104 can be implemented with any number and combination of differing components as further described with reference to the example device shown in FIG. 8. The example client device 102 can include any number of social network applications 146 that correlate to the social network service 106 and/or other social networking sites. A social network application 146 interfaces the client device 102 to receive shared content 148 from the social network service 106. The shared content 148 is received at the client device 102 in a display layout format 150 for optimal display of the shared content (e.g., on display device 144 in a client system).

FIG. 2 illustrates an example template 200 in accordance with the various embodiments of adaptable layouts for social feeds as described herein. The template 200 is an example of the layout templates 126 described with reference to FIG. 1. Although only one template is shown and described, many templates may be generated that are similar for different activities. A template model may be generic, but include different types of data depending on a social network update action (e.g., to upload photos, share a URL link, update a social network user status, etc.).

Figure 3:
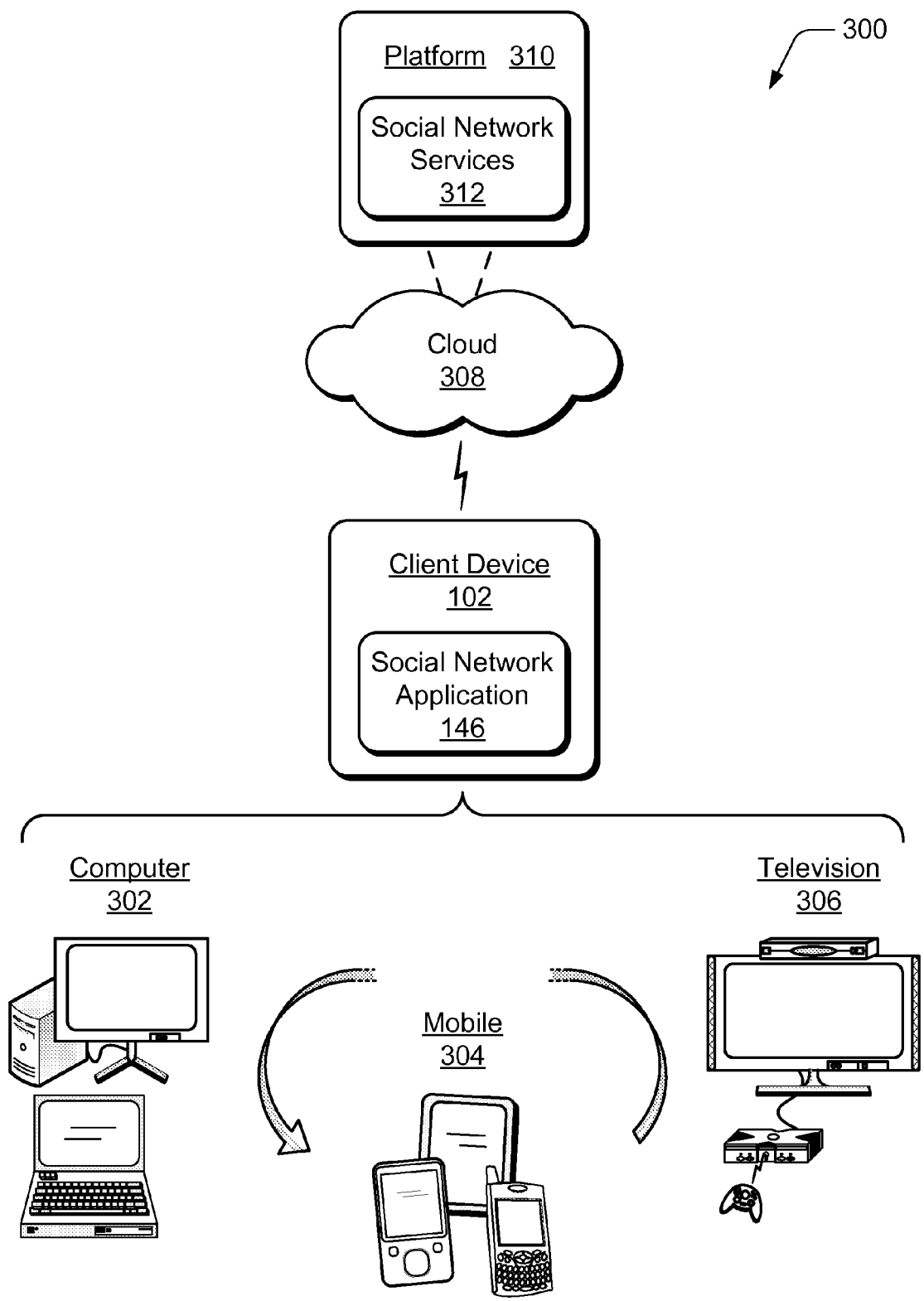
FIG. 3 illustrates an example system with multiple devices that can implement various embodiments of adaptable layouts for social feeds for a seamless user experience in ubiquitous environments.

FIG. 3 illustrates an example system 300 that includes the client device 102 as described with reference to FIG. 1. The example system 300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 302, mobile 304, and television 306 uses. Each of these configurations includes devices that may have generally different constructs and capabilities, and thus the client device 102 may be configured according to one or more of the different device classes. For instance, the client device 102 may be implemented as the computer 302 class of a device that includes a personal computer, desktop computer, a multi-screen computer, laptop computer, netbook, and so on.

The client device 102 may also be implemented as the mobile 304 class of device that includes mobile devices, such as a mobile phone, portable music player, portable gaming device, a tablet computer, a multi-screen computer, and so on. The client device 102 may also be implemented as the television 306 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of adaptable layouts for social feeds.

The cloud 308 includes and/or is representative of a platform 310 for social network services 312. The platform 310 abstracts underlying functionality of hardware (e.g., servers) and software resources of the cloud 308. The social network services 312 may include applications and/or data that can be utilized while computer processing is executed on servers that are remote from the client device 102. For example, the social network services 312 may include the social network service 106 and/or the adaptable layout service 122 as described with reference to FIG. 1. The social network services 312 can be provided as a service over the Internet and/or through a subscriber network, such as a cellular or WiFi network.

The platform 310 may abstract resources and functions to connect the client device 102 with other computing devices. The platform 310 may also serve to abstract scaling of resources to provide a corresponding level of scale to encountered demand for the social network services 312 that are implemented via the platform 310. Accordingly, in an interconnected device embodiment, implementation of functionality of the social network application 146 may be distributed throughout the system 300. For example, the social network application 146 may be implemented in part on the client device 102 as well as via the platform 310 that abstracts the functionality of the cloud 308.

Example methods 400, 500, 600, and 700 are described with reference to respective FIGS. 4, 5, 6, and 7 in accordance with one or more embodiments of adaptable layouts for social feeds. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
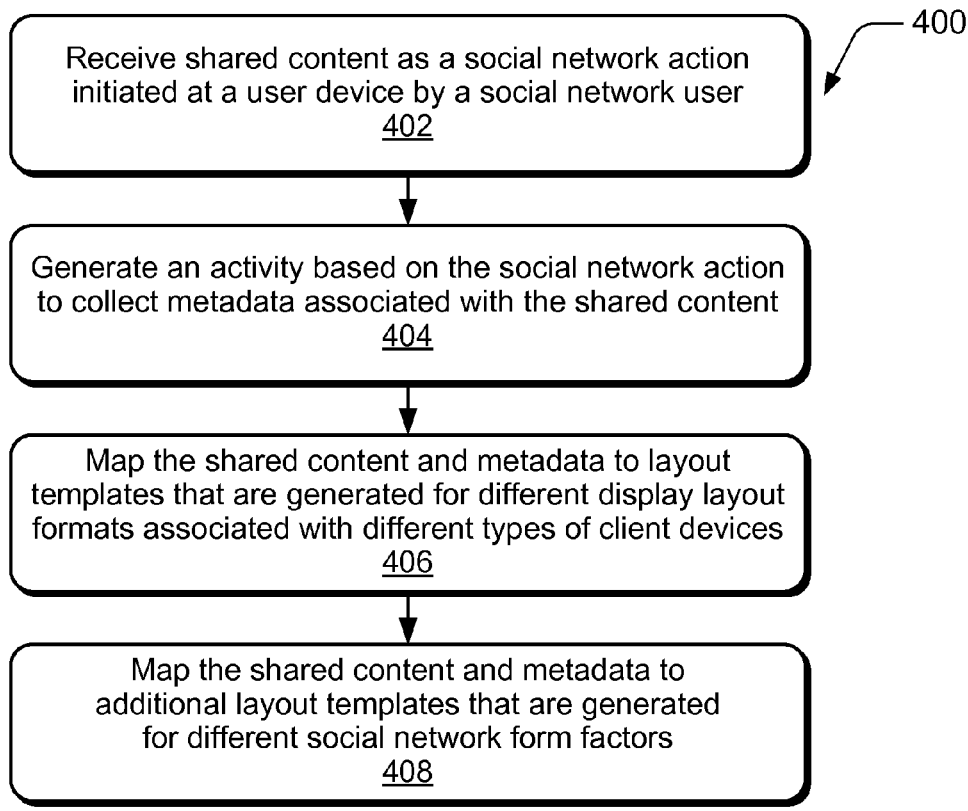
FIG. 4 illustrates example method(s) of adaptable layouts for social feeds in accordance with one or more embodiments.

FIG. 4 illustrates example method(s) 400 of adaptable layouts for social feeds, and is described with reference to a social network service that implements an adaptable layout service. The order in which the method blocks are described are not intended to be construed as a limitation, and any number of the described method blocks can be combined in any order to implement a method, or an alternate method.

At block 402, shared content is received as a social network action initiated at a user device by a social network user. For example, the social network service 106 receives shared content 108 as a social network action initiated at a user device (e.g., client device 102) by a social network user. For example, a social network user may share content such as a status update, uploaded photos, a shared URL link, or any other type of shared content.

At block 404, an activity is generated based on the social network action to collect metadata associated with the shared content. For example, the adaptable layout service 122 generates an activity to collect metadata associated with shared content based on a social network action. Social network updates include properties that describe how an update (e.g., shared content 108) can be rendered in various form factors, and this information (e.g., content metadata 118) is associated with each type of update. At block 406, the shared content and the metadata is mapped to layout templates that are each generated for different display layout formats associated with different types of client devices.

At block 408, the shared content and the metadata is mapped to additional layout templates that are each generated for different social network form factors. For example, the adaptable layout service 122 maps the shared content 108 and the content metadata 118 to layout templates 126 that are generated for different display layout formats 128 and/or for different social network form factors 130. The different display layout formats 128 are associated with different types of client devices 104, and the different social network form factors 130 are associated with different types of social network Web sites. For example, if a user uploads photos to the social network service 106, a mapping can be applied by the adaptable layout service 122 if the upload is going to be re-published to a text-based social networking site like TWITTER or will be displayed on an application, such as a TWITTER client. The mapping can be applied to convert from image references (i.e., references to the images) to URL references (i.e., references to URLs) that are selectable to direct a user to where the images are located online, such as the shared content 108 at the social network service.

Figure 5:
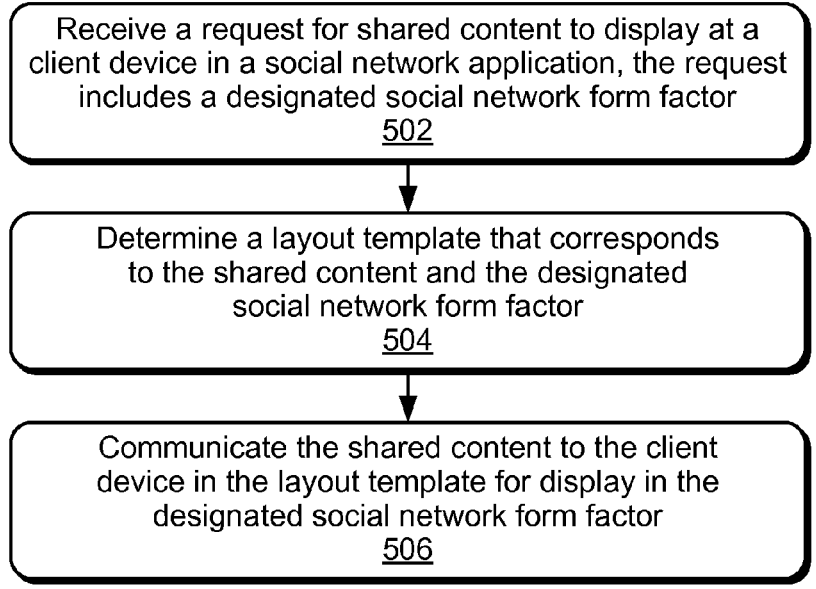
FIG. 5 illustrates additional example method(s) of adaptable layouts for social feeds in accordance with one or more embodiments.

FIG. 5 illustrates example method(s) 500 of adaptable layouts for social feeds. The order in which the method blocks are described are not intended to be construed as a limitation, and any number of the described method blocks can be combined in any order to implement a method, or an alternate method.

At block 502, a request is received for shared content to display at a client device in a social network application, where the request includes a designated social network form factor. For example, the social network service 106 receives a request for the shared content 108 to display at the client device 102 in a social network application 146, and the request from the client device includes a designated social network form factor 130.

At block 504, a layout template is determined that corresponds to the shared content and the designated social network form factor. For example, the adaptable layout service 122 determines a layout template 126 that corresponds to the shared content and the designated social network form factor 130. At block 506, the shared content is communicated to the client device in the layout template for display in the designated social network form factor. For example, the social network service 106 communicates the shared content to the requesting client device in the layout template for display in the designated social network form factor.

Figure 6:
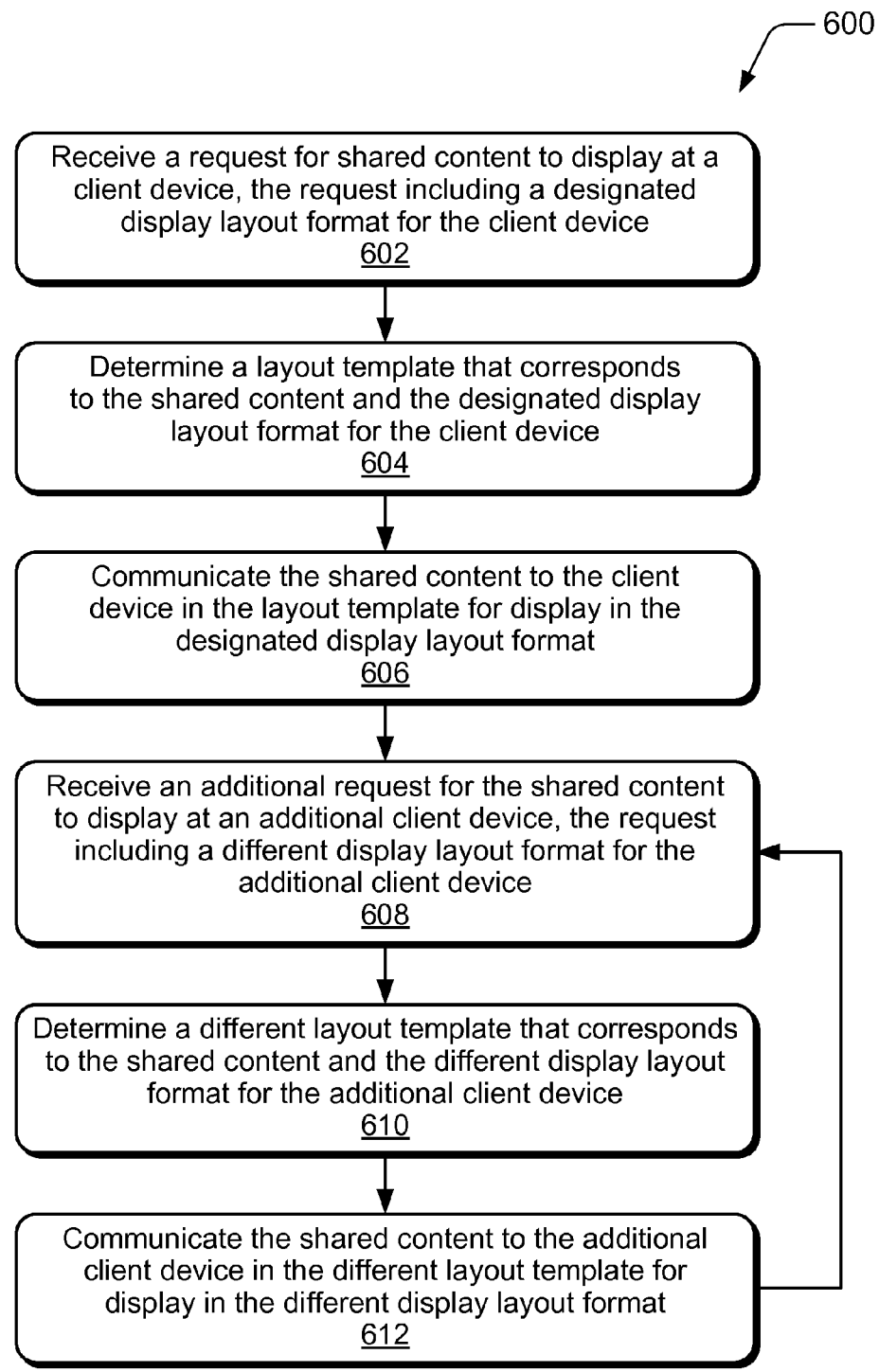
FIG. 6 illustrates additional example method(s) of adaptable layouts for social feeds in accordance with one or more embodiments.

FIG. 6 illustrates example method(s) 600 of adaptable layouts for social feeds. The order in which the method blocks are described are not intended to be construed as a limitation, and any number of the described method blocks can be combined in any order to implement a method, or an alternate method.

At block 602, a request is received from a client device for shared content to display at the client device, where the request includes a designated display layout format for the client device. For example, the social network service 106 receives a request for the shared content 108 to display at the client device 102, and the request from the client device includes a designated display layout format 128 for the client device.

At block 604, a layout template is determined that corresponds to the shared content and the designated display layout format for the client device. For example, the adaptable layout service 122 determines a layout template 126 that corresponds to the shared content and the designated display layout format 128 for the client device. At block 606, the shared content is communicated to the client device in the layout template for display in the designated display layout format. For example, the social network service 106 communicates the shared content to the requesting client device in the layout template for display in the designated display layout format.

At block 608, an additional request is received from an additional client device for the shared content to display at the additional client device, where the additional request includes a different display layout format for the additional client device. For example, the social network service 106 receives an additional request for the shared content 108 to display at an additional client device 104, and the additional request from the client device includes a different display layout format 128.

At block 610, a different layout template is determined that corresponds to the shared content and the different display layout format for the additional client device. For example, the adaptable layout service 122 determines a different layout template 126 that corresponds to the shared content and the different display layout format 128 for the additional client device. At block 612, the shared content is communicated to the additional client device in the different layout template for display in the different display layout format for the additional client device. For example, the social network service 106 communicates the shared content to the requesting client device in the different layout template for display in the different display layout format.

The method can then repeat at blocks 608-612 to receive requests for the shared content from various client devices, determine different layout templates for respective different type client devices, and communicate the shared content to the requesting client devices for display in the different display layout formats.

Figure 7:
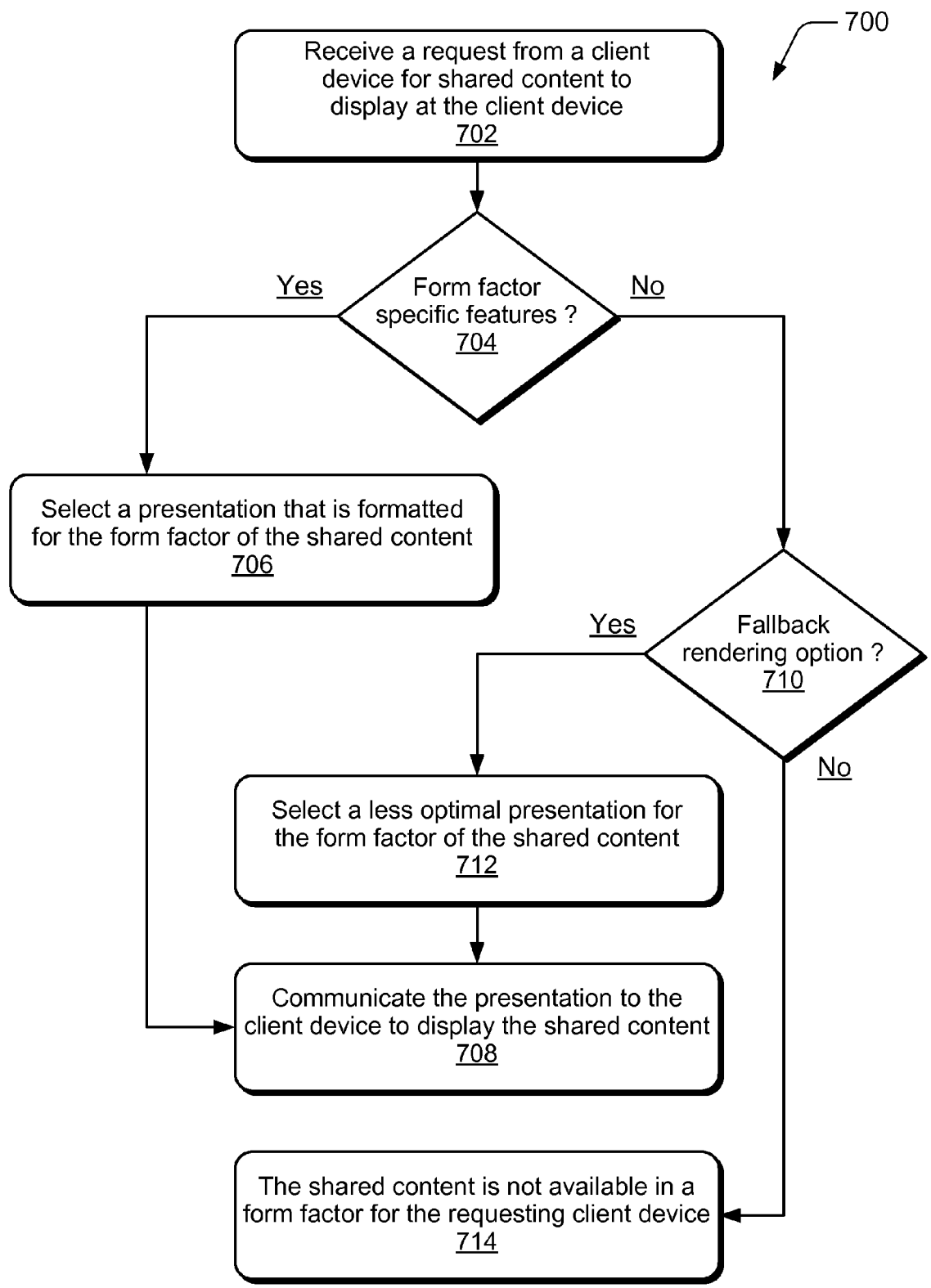
FIG. 7 illustrates additional example method(s) of adaptable layouts for social feeds in accordance with one or more embodiments.

FIG. 7 illustrates example method(s) 700 of adaptable layouts for social feeds. The order in which the method blocks are described are not intended to be construed as a limitation, and any number of the described method blocks can be combined in any order to implement a method, or an alternate method.

At block 702, a request is received from a client device for shared content to display at the client device. For example, the social network service 106 receives a request from the client device 102 for the shared content 108 to display at the client device.

At block 704, a determination is made as to whether the shared content has form factor specific features. If the adaptable layout service 122 determines that the shared content 108 does have form factor specific features (i.e., "yes" from block 704), then at block 706, a presentation that is formatted for the form factor is selected. At block 708, the presentation is communicated to client device to display the shared content. For example, the adaptable layout service 122 selects a presentation that is formatted for the form factor and communicates the presentation to the requesting client device to display the shared content.

If the adaptable layout service 122 determines that the shared content does not have form factor specific features (i.e., "no" from block 704), then at block 710, a determination is made as to whether there is a fallback rendering option for the requesting client device. If the adaptable layout service 122 determines that there is a fallback rendering option (i.e., "yes" from block 710), then at block 712, a less optimal presentation for the form factor is selected and the presentation is communicated to client device to display the shared content at block 708. For example, the adaptable layout service 122 selects a less optimal presentation that is formatted for the form factor and communicates the less optimal presentation to the requesting client device to display the shared content. If the adaptable layout service 122 determines that there is not a fallback rendering option for the requesting client device (i.e., "no" from block 710), then at block 714, the shared content is not available to the requesting client device.

Figure 8:
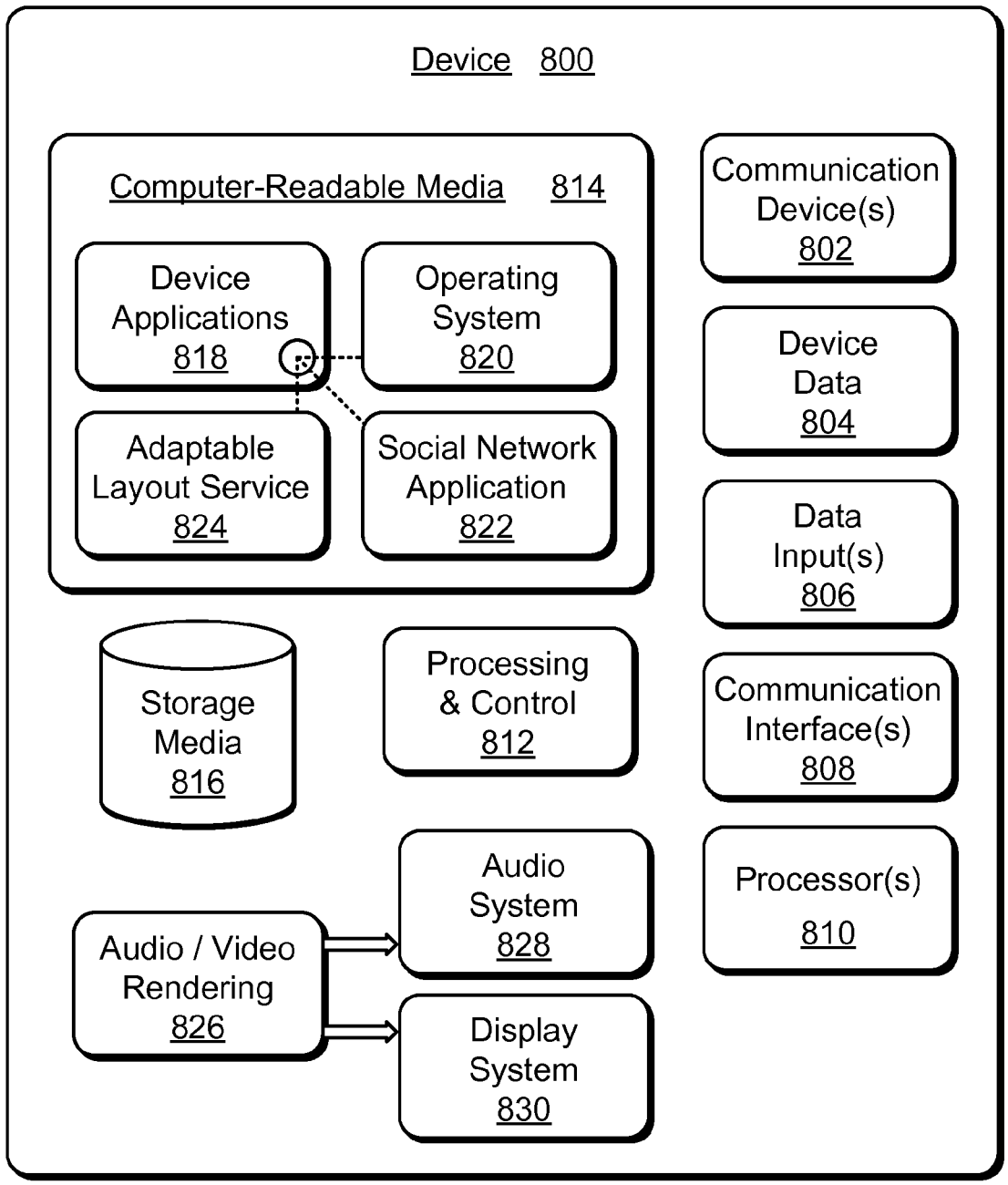
FIG. 8 illustrates various components of an example device that can implement embodiments of adaptable layouts for social feeds.

FIG. 8 illustrates various components of an example device 800 that can be implemented as any type of client and/or computing device as described with reference to the previous FIGS. 1-7 to implement embodiments of adaptable layouts for social feeds. In embodiments, device 800 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 800 may also be associated with a user (i.e., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of adaptable layouts for social feeds. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal processing and control module, code that is native to a particular device, a hardware abstraction layer for a particular device, and so on.

The device applications 818 also include any system components or modules to implement embodiments of adaptable layouts for social feeds. In this example, the device applications 818 include a social network application 822, such as when device 800 is implemented as a client device. Alternatively or in addition, the device applications 818 include an adaptable layout service 824, such as when device 800 is implemented as a social network service. The social network application 822 and the adaptable layout service 824 are shown as software modules and/or computer applications. Alternatively or in addition, the social network application 822 and/or the adaptable layout service 824 can be implemented as hardware, software, firmware, or any combination thereof.

Device 800 also includes an audio and/or video rendering system 826 that generates and provides audio data to an audio system 828 and/or generates and provides display data to a display system 830. The audio system 828 and/or the display system 830 can include any devices that process, display, and/or otherwise render audio, display, and image data. Display data and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although embodiments of adaptable layouts for social feeds have been described in language specific to features and/or methods, it is to be understood that the subject of the appended claims is not necessarily limited to the specific features or methods described. Rather, the specific features and methods are disclosed as example implementations of adaptable layouts for social feeds.

The invention claimed is:

1. A computer-implemented method, comprising:
receiving shared content as a social network action initiated at a user device by a social network user;
generating an activity based on the social network action to collect metadata associated with the shared content;
in response to one or more layout templates being generated for different display layout formats associated with different types of client devices and for different social network form factors, wherein the different social network form factors are associated with different types of social network Web sites, mapping the shared content and the metadata to the one or more layout templates, the social network action including uploading photos, sharing a URL link, and updating a social network status, the one or more layout templates including different types of data, respectively, depending on the social network action; and
in response to the shared content not having social network form factor specific features, presenting the content using a fallback rendering option.

2. A computer-implemented method as recited in claim 1, wherein the shared content further includes at least one of a status update from the social network user or a shared URL link.

3. A computer-implemented method as recited in claim 1, wherein each layout template includes one or more layout properties that correlate to template data for the activity that is generated based on the social network action.

4. A computer-implemented method as recited in claim 1, further comprising:
receiving a request for the shared content to display at a client device in a social network application, the request including a designated social network form factor;
determining a layout template that corresponds to the shared content and the designated social network form factor; and
communicating the shared content to the client device in the layout template for display in the designated social network form factor.

5. A computer-implemented method as recited in claim 1, further comprising:
receiving a request from a client device for the shared content to display at the client device, the request including a designated display layout format for the client device;
determining a layout template that corresponds to the shared content and the designated display layout format for the client device; and
communicating the shared content to the client device in the layout template for display in the designated display layout format.

6. A computer-implemented method as recited in claim 5, further comprising:
receiving an additional request from an additional client device for the shared content to display at the additional client device, the additional request including a different display layout format for the additional client device;
determining a different layout template that corresponds to the shared content and the different display layout format for the additional client device; and
communicating the shared content to the additional client device in the different layout template for display in the different display layout format for the additional client device.

7. A system, comprising:
a social network service configured to receive shared content as a social network action initiated at a user device by a social network user, the shared content comprising at least a URL link;
at least a memory and a processor to implement an adaptable layout service configured to:
generate an activity based on the social network action to collect metadata associated with the shared content, the activity comprising at least obtaining the URL from the link, getting a thumbnail image for the link, and generating a large image relating to the URL for display on larger display devices;
in response to one or more layout templates being generated for different display layout formats associated with different types of client devices and for different social network form factors, wherein the different social network form factors are associated with different types of social network Web sites, map the shared content and the metadata to the one or more layout templates, the mapping comprising converting one or more elements of the shared content to other display methods based at least in part on the social network that is receiving the shared content; and in response to the shared content not having social network form factor specific features, present the content using a fallback rendering option.

8. A system as recited in claim 7, wherein the different display layout formats are associated with different types of client devices.

9. A system as recited in claim 7, wherein the shared content further includes at least one of a status update from the social network user or uploaded photos.

10. A system as recited in claim 7, wherein each layout template includes one or more layout properties that correlate to template data for the activity that is generated based on the social network action.

11. A system as recited in claim 7, wherein:
the social network service is further configured to receive a request for the shared content to display at a client device in a social network application, the request including a designated social network form factor;
the adaptable layout service is further configured to:
determine a layout template that corresponds to the shared content and the designated social network form factor; and
communicate the shared content to the client device in the layout template for display in the designated social network form factor.

12. A system as recited in claim 7, wherein:
the social network service is further configured to receive a request from a client device for the shared content to display at the client device, the request including a designated display layout format for the client device;
the adaptable layout service is further configured to:
determine a layout template that corresponds to the shared content and the designated display layout format for the client device; and
communicate the shared content to the client device in the layout template for display in the designated display layout format.

13. Computer-readable storage media devices comprising instructions that are executable and, responsive to executing the instructions, a computer device:
receives shared content as a social network action initiated at a user device by a social network user;
generates an activity based on the social network action to collect metadata associated with the shared content; and
in response to one or more layout templates being generated for different display layout formats associated with different types of client devices and for different social network form factors, wherein the different social network form factors are associated with different types of social network Web sites, map the shared content and the metadata to the one or more layout templates, the social network action including uploading photos, sharing a URL link, and updating a social network status, the one or more layout templates including different types of data, respectively, depending on the social network action; and
in response to the shared content not having social network form factor specific features, present the content using a fallback rendering option.

14. Computer-readable storage media devices as recited in claim 13, further comprising additional instructions that are executable and, responsive to executing the additional instructions, the computer device:
receives a request for the shared content to display at a client device in a social network application, the request including a designated social network form factor;
determines a layout template that corresponds to the shared content and the designated social network form factor; and
communicates the shared content to the client device in the layout template for display in the designated social network form factor.

15. Computer-readable storage media devices as recited in claim 13, further comprising additional instructions that are executable and, responsive to executing the additional instructions, the computer device:
receives a request from a client device for the shared content to display at the client device, the request including a designated display layout format for the client device;
determines a layout template that corresponds to the shared content and the designated display layout format for the client device; and
communicates the shared content to the client device in the layout template for display in the designated display layout format.

16. Computer-readable storage media devices as recited in claim 13, further comprising additional instructions that are executable and, responsive to executing the additional instructions, the computer device receives the shared content as two or more of a status update from the social network user, uploaded photos, or a shared URL link.

17. Computer-readable storage media devices as recited in claim 13, further comprising additional instructions that are executable and, responsive to executing the additional instructions, the computer device generates each of the one or more layout templates to include one or more layout properties that correlate to template data for the activity that is generated based on the social network action.

* * * * *